United States Patent Office 3,475,208
Patented Oct. 28, 1969

3,475,208
CHROMATOGRAPHY PAPER PRODUCED BY IMPREGNATING A SUBSTRATE WITH A SOLUTION OF POLYESTER IN CHLORAL HYDRATE
Clarence A. Bowers, Decatur, and John W. Bullington, Athens, Ala., assignors to Monsanto Company, St. Louis, Mo., a corporation of Delaware
No Drawing. Filed Feb. 4, 1966, Ser. No. 525,149
Int. Cl. C08f 45/30; B44d 1/22
U.S. Cl. 117—155     1 Claim

ABSTRACT OF THE DISCLOSURE

Polyester chromatography paper to be used in determining dyeing characteristics of polyester polymer is prepared by dissolving a polyester polymer in chloral hydrate, adding a stabilizing amount of chloroform, impregnating a cellulosic paper with the polyester solution, and drying the paper.

---

Heretofore, the techniques of chromatographic absorption or chromatography have been used in a large variety of ways. Acrylic papers containing ionic groups ($SO_3H$, COOH) have been used for the separation of cationic dyes by descending paper chromatography. Cellulose paper impregnated with polyamide has been used for the same purpose in separating acid dyes. In dye laboratories which are set up to analyze dye products, the use of chromatography as a method of analysis is actually essential to resolve complicated formulations.

By in large, chromatography has been used mainly in the fields of quantitative and qualitative analysis, with separation being the main objective. The various components of compositions can be separated, analysed, and determined.

The techniques of chromatography have been used not only to separate dyes, but also to determine the dye affinity of polymers. It is known that $R_f$ (rate of flow) values are directly related to the dye affinity. Usually a number of dyes are applied to an impregnated substrate at the same time. The dye, within the group of dyes that are applied to the substrate, which has the smallest $R_f$ value is the one for which the polymer has the greatest attraction or affinity.

The dyes in question may be comprised of one component or may be made up of several dyes or colors. The components of the composition dyes can be separated and the $R_f$ value for each component determined. Therefore a polymer's affinity for composite or component dyes can be determined.

Although this has been known, a suitable paper has not been developed for all polymers. It is necessary to impregnate a paper or other substrate with the polymer in question in order that its dye affinity may be ascertained.

According to the present invention it has now been found that the difficulties and necessity of actual test dyeing of polyesters can be overcome by impregnating a substrate with a polyester and taking advantage of the techniques of chromatography.

Therefore, an object of this invention is to prepare chromatography paper to be used in determining the dye affinity of polyesters.

Another object of this invention is to obviate the necessity of actual test dyeing of polyester products. The behavior of dyes toward polyesters can be predicted without doing any dyeings.

These and other objects and advantages will become more readily apparent from the following detailed description.

In order to arrive at a suitable chromatography paper to be used in determining the dye affinities of polyesters, a suitable solvent must be found for the polyesters. In many cases more than a suitable solvent may be necessary. For example, the polyester may precipitate out at a particular stage, thus hindering impregnation of the paper. In such a case, an additive may have to be added to the solution in which the strips of paper are to be placed to effect impregnation. The particular paper or fibrous substrate to be used can also influence the results. Generally through, the filter paper is not a factor of concern. In other words, the overall results may be affected, but the effect of one dye relative to another remains the same. After the strips of paper are dipped into the prepared solution, drying procedures often are necessary.

Being more specific, a heated solution of polyester and chloral hydrate is prepared. This solution is diluted with enough chloroform to prevent precipitation of the polyester upon cooling. Strips of filter paper or other suitable substrate are dipped into this solution for a sufficient time to become saturated. The strips are then removed and allowed to cool. Upon cooling, the chloroform will evaporate. The chloral hydrate may be sublimed by applying heat, such as in an oven. The weight of the filter paper is increased by a percentage conditioned upon varying the procedure outline above.

After preparing the paper several dyes (disperse, basic, etc.) are applied to it and developed by using any of the standard methods of chromatography (descending, ascending, etc.). The dyes will move at different rates on the paper. The $R_f$ (rate of flow) values can be determined and from this determination the affinity the polyester has for the several dyes can be ascertained.

The polyester contemplated by this invention comprises any manufactured fiber in which the fiber-forming substance is any long-chain synthetic polymer comprised of at least 85% by weight of an ester of a dihydric alcohol and terephthalic acid. This may comprise Dacron (polyethylene terephthalate), Kodel, Fortrel, Vycron, etc.

The following examples are intended to illustrate the invention and not to limit it in any way.

Example I

A 5 percent solution of polyester in 100 percent chloral hydrate is prepared at 50°–90° C. Enough chloroform is added to this solution (½ to 4 volumes) to prevent precipitation of the polyester upon cooling. Strips of cellulose fiber paper are dipped into this prepared solution for one minute. The strips are removed and the chloroform is allowed to evaporate at ambient conditions. The chloral hydrate is sublimed at temperatures greater than 90° C. in an oven. The increase in the weight of the paper is between 4 and 30 percent.

Example II

A 5 percent solution of polyester in chloral hydrate is prepared at 80° C. This solution is diluted with 3 volumes of chloroform. Strips of Whatman #1 chromatography cellulose paper are dipped for 1 minute in this solution. The papers are allowed to drip at room temperature until the chloroform has evaporated. The papers are then placed in an oven at 120° C. for 5 minutes to sublime the chloral hydrate. The paper increased 4 percent in weight.

Having thus described the invention, it is to be understood that various changes may be made without departing from the spirit of the disclosure.

What is claimed is:
1. A method of preparing polyester chromatography paper comprising the steps of:
 (a) preparing a solution containing about 5 percent of a polyester polymeric material being polyethylene terephthalate by dissolving the polyester material in chloral hydrate upon the application of heat;

(b) adding to one volume of the chloral hydrate solution from 0.5 to 4 volumes of chloroform to prevent precipitation of the polyester upon cooling;
(c) impregnating a fibrous substrate with the solution; and
(d) drying the impregnated substrate to remove the chloroform and the chloral hydrate and to thereby increase the weight of paper between 4 and 30 percent.

References Cited

UNITED STATES PATENTS

| | | | |
|---|---|---|---|
| 2,752,320 | 6/1956 | De Witt | 260—33.4 |
| 3,303,043 | 2/1967 | Halpaap et al. | 117—33.5 |

FOREIGN PATENTS 503,749  6/1954  Canada.

WILLIAM D. MARTIN, Primary Examiner

M. LUSIGNAN, Assistant Examiner

U.S. Cl. X.R.

23—230; 210—31; 260—32.8, 33.8